United States Patent
Villagran et al.

(12)

(10) Patent No.: US 6,180,159 B1
(45) Date of Patent: Jan. 30, 2001

(54) BEVERAGES WITH IMPROVED TEXTURE AND FLAVOR IMPACT AT LOWER DOSAGE OF SOLIDS

(75) Inventors: Francisco Valentino Villagran, Mason; Jeffrey Lee Butterbaugh; Leonard Edwin Small, both of Cincinnati; Jeffrey Alan Sargent, West Chester, all of OH (US)

(73) Assignee: The Procter & Gamble Company, Cincinnati, OH (US)

(*) Notice: Under 35 U.S.C. 154(b), the term of this patent shall be extended for 0 days.

(21) Appl. No.: 09/239,612

(22) Filed: Jan. 29, 1999

Related U.S. Application Data

(63) Continuation-in-part of application No. 09/016,255, filed on Jan. 30, 1998, now abandoned.

(51) Int. Cl.[7] ............................... A23L 2/38; A23L 2/39; A23L 2/56
(52) U.S. Cl. .................. 426/590; 426/573; 426/580; 426/593; 426/594; 426/597; 426/601; 426/613; 426/654
(58) Field of Search ..................... 426/590, 573, 426/601, 613, 654, 580, 594, 597, 593, 658

(56) References Cited

U.S. PATENT DOCUMENTS 5,789,004 * 8/1998 Hogan et al. ................. 426/573

* cited by examiner

Primary Examiner—Helen Pratt
(74) Attorney, Agent, or Firm—Karen F. Clark; Jacobus C. Rasser

(57) ABSTRACT

A flavored instant or ready-to-drink beverage product that can deliver a rich, preferably frothy, foamy beverage with a clean, improved mouthfeel and thickness without sliminess, as well as a higher flavor impact at a lower dosage of solids is disclosed. These products contain a water-insoluble component that includes microparticulate component, a fat/oil component, an emulsifier, and optionally, microcrystalline cellulose; a water-soluble component that includes a soluble beverage component, a thickener, and optionally, a buffer; a foam stabilizer; and optionally, acid carbonate/bicarbonate; a sweetener; milk solids; processing aids; and flavorants; and, optionally, and preferably in ready-to-drink formulations, up to 95% water. The ratio of water-soluble to water-insoluble components is about 3.3 or less (i.e., the ratio of water-insoluble to water-soluble (I/S) components is 0.30 or greater) and/or the level of water-insoluble components per unit volume of the product is at least about 0.019 g/cc. These products preferably include the combination of sugar and a high intensity sweetener to help reduce the level of solids in the beverage. This product also preferably contains a foaming creamer, a foam generating system, and a protein foam stabilizer to provide a foamy, frothy beverage.

17 Claims, No Drawings

BEVERAGES WITH IMPROVED TEXTURE AND FLAVOR IMPACT AT LOWER DOSAGE OF SOLIDS

CROSS REFERENCE TO RELATED APPLICATION

This application is a Continuation-in-Part of application Ser. No. 09/016,255, filed Jan. 30, 1998 now abandoned.

TECHNICAL FIELD

The present application relates to flavored instant and ready-to-drink beverages (coffees, hot chocolate, teas, creamy juice drinks, milk shakes, nutritional drinks, and the like) having an improved, cleaner mouthfeel, delivering creaminess, richness and/or thickness at a lower dosage of solids, but without mouthfeel negatives, such as "sliminess" or "stringiness". Additionally, the present application relates to instant coffee products that deliver these mouthfeel and thickness benefits, as well as higher flavor impact and a frothy, foamy beverage.

BACKGROUND OF THE INVENTION

Current dry mixes used to prepare many instant or ready-to-drink beverages, especially instant flavored coffee beverages, typically comprise a mixture of non-dairy creamers, sweeteners, soluble beverage components (e.g. instant coffee products use soluble coffee) and flavors. See, for example, U.S. Pat. No. 5,433,962 (Stipp). Ready-to-drink beverages, in the form sold to consumers, usually have from 10–20% solids. Consumers usually prepare flavored instant beverages using, on average, 7.5% solids, and generally in the range of 5%–10% solids. Unfortunately, at a 5–10% dosage of solids, instant beverages prepared from current dry mixes are perceived as thin and watery and do not develop any foamy/frothy head. They also lack the creamy mouthfeel, richness, flavor impact and sweetness that is desired by consumers of such products. These important attributes are delivered in ready-to-drink creamy beverages via a high level of solids (>12%) alone, or in combination with hydrocolloids, pectins, and starches.

Creamy beverages, generally, and creamy coffee beverages, in particular, typically rely on finely dispersed fat (i.e., homogenized fat) to deliver mouthfeel. This emulsified fat can be delivered by liquid or spray dried non-dairy creamers, whole milk, or low fat milk. However, the fat found at normal levels in current flavored coffee beverages provides insufficient mouthfeel benefits. These mouthfeel benefits can be improved by increasing the level of fat. However, increasing the level of fat creates other issues such as stability of the fat against oxidative reactions, the development of off-flavors, and the potential instability of the emulsion of the non-dairy creamer. Further, since non-dairy creamers typically contain only 35 to 50% fat, delivering increased mouthfeel can require significantly higher volumes or dosages of powdered products. This makes these powdered products less useful, for the consumer, as spoonable executions.

An alternative approach to deliver mouthfeel is to use ingredients that increase the thickness (viscosity) of the beverage. However, increasing the viscosity of the beverage does not necessarily translate into an increase in desirable mouthfeel attributes. Mouthfeel is more of a sensory perception influenced by forces distinct from those that contribute to viscosity which give the perception of thickness. Hydrocolloid gums and water-soluble starches are typically used to increase beverage thickness (i.e., viscosity). However, hydrocolloid gums can only develop limited mouthfeel and impart negative textural effects such as "sliminess" and "stringiness." In addition, beverage products, especially hot beverages, which incorporate high concentrations of hydrocolloid gums are subject to gel upon cooling.

Water-soluble starches can also be used to increase viscosity and provide limited mouthfeel. However, the quantity of water-soluble starch needed to deliver these attributes is usually so high that more solids are added and the desired target dosage of solids of about 5–10% (generally about 7.5% solids for instant coffee products) cannot be achieved. Mouthfeel, richness, creaminess, sweetness and flavor impact can be increased by delivering a higher dosage of solids, i.e., greater than about 10% solids. However, such a high level of delivered solids requires larger volume of product to be used. This usually translates to an increase in the number of spoonfuls of product required to prepare the beverage.

SUMMARY OF THE INVENTION

The present invention relates to instant and ready-to-drink flavored beverage products, (coffee, hot chocolate, teas, creamy juice drinks, milk shakes, nutritional drinks, and the like, especially instant coffee products), that have improved mouthfeel ("creaminess", "richness", "body", "complexity", "body-richness", "substantial") and thickness, without "sliminess" or "stringiness". These beverage products comprise: a water-insoluble component, a water-soluble component, and optionally, water and/or a flavorant. Said water-insoluble component has particles with a mean particle size diameter of from about 0.1 to about 3.0 microns and includes: (1) from about 0.2 to about 40% of a microparticulate component; (2) from about 0.0 to about 40% of a fat/oil component; (3) from about 0.0 to about 3.0% of an emulsifier; (4) from about 0 to about 5% of a microcrystalline cellulose. Said water-soluble component includes: (1) from about 0.075 to about 40% soluble beverage component; (2) from about 0.05 to about 30% of a thickener; (3) from about 0 to about 4% buffers; (4) from about 0 to about 60% foam stabilizer; (5) from about 0 to about 5% acid; (6) from about 0 to about 5% carbonate/bicarbonate; (7) from about 0 to about 10% sweetener; (8) from about 0 to about 20% milk solids; and (9) from about 0 to about 3% processing aids. The flavored beverage products also comprise from about 0 to about 10% of a flavorant. Said flavorant may be included in the water-insoluble component, the water-soluble component, or both. Said flavored beverage also comprises from about 0 to about 95%, preferably from about 80 to about 95%, water. The ratio of the water-soluble to water-insoluble (S/I) components is about 3.3 or less (i.e., the ratio of water-insoluble to water-soluble (I/S) components is 0.30 or greater) or the water-insoluble component per unit volume of the product is at least about 0.019 g/cc.

The beverage products of the present invention, (especially preferred are instant coffee products), can deliver a creamy, rich, preferably foamy, beverage with a clean, improved mouthfeel and thickness without "sliminess" or "stringiness", as well as a higher flavor impact, at a lower dosage of solids (5–10%, preferably 6.5–8.5%, and more preferably 7.5%). This is achieved by formulating said beverage products so that (1) the level of finely dispersed water-insoluble components in the product is such that the ratio of water-soluble to water-insoluble components (S/I) is about 3.3 or less (i.e., the ratio of water-insoluble to water-soluble (I/S) components is 0.30 or greater); or (2) the level of water-insoluble components per unit volume (I/V), is at least about 0.019 grams per cubic centimeter; or (3) both.

It is also preferable to include a combination of ingredients for mouthfeel and thickeners (e.g., starches and gums) to provide improved texture in the beverage prepared from the product. It is also preferable for these beverage products to include a sugar such as sucrose (or other acceptable sugars such as sorbitol, fructose, mannose), and a high intensity sweetener, preferably a combination of aspartame and acesulfame K, to help maintain a low level of solids in the drinkable beverage, yet deliver higher flavor impact and richness. These products may also optionally, but preferably for instant coffee beverages, contain a foaming creamer, a foam generating system, and a protein foam stabilizer to provide a foamy, frothy beverage. These products also optionally, but preferably, contain an effective amount of a flavorant.

DETAILED DESCRIPTION OF THE INVENTION

A. Definitions

As used herein, the terms "ready-to-serve beverage" and "ready-to-drink beverage" are used interchangeably to refer to beverage products that are in a ready-to-use, consumable form. These products are prepared by a manufacturer and sold to the consumer in consumable form. They can be made at the manufacturer level from dry mixes, powders, liquids, extracts, concentrates, and emulsions, using a wide variety of formulations.

As used herein, the terms "instant beverage" and "soluble beverage" are used interchangeably to refer to beverage products such as instant or soluble coffee products that are relatively soluble in water, especially hot water, and are typically mixed with an aqueous liquid or diluent, i.e., water, milk or other aqueous medium, to provide a ready-to-serve or ready-to-drink beverage. These products are sold to the consumer by the manufacturer in a dry mix, powder, concentrate, or emulsion form and are prepared by the consumer, according to directions, at or near the time of serving and/or consumption.

"Bulk density" refers to the overall density of a plurality of particles measured in the manner described on pp. 127–131 of COFFEE PROCESSING TECHNOLOGY, Avi Publishing Company, Westport, Conn., 1963, Vol. II.

The terms "moisture" and "water" are used interchangeably herein.

All particle sizes referred to herein are based on the U.S. Standard Sieve Screen Series. See page 701 of Sivetz & Desrosier, COFFEE TECHNOLOGY (Avi Publishing Co. 1979).

As used herein, the term "foam" refers to a light frothy mass formed in or on the surface of the coffee beverage (generally coffee or hot chocolate). "Foam" is generally achieved utilizing a fine dispersion of gas in a liquid to form said mass on the beverage surface.

As used herein, the term "solids" are used to refer to all water-insoluble components and water-soluble components.

As used herein, the term "water-insoluble components" refers to those materials that are not soluble or miscible in water but are typically dispersed in the aqueous phase and are visible when viewed through a microscope. The water-insoluble components typically include fat/oil components, microparticulate components, and emulsifiers, and may optionally include flavorants and microcrystalline cellulose.

One of ordinary skill in the art will readily understand that the water-insoluble components may be derived from multiple source ingredients (e.g., the fat/oil component may come from a creamer and whole milk, 2% fat milk), and one source ingredient may contribute to multiple water-insoluble components (e.g., a creamer may contribute to the fat/oil component and to the emulsifier).

As used herein, the term "water-soluble component" refers to those materials that are soluble or completely miscible in water and are not visible when viewed through a microscope. The water-soluble components typically include the sweeteners, buffers derived from salts (i.e., sodium bicarbonate, dipotassium phosphate), and acids (i.e., citric acid), thickeners, such as hydrolyzed starches (e.g., maltodextrins); pre-gelatinized starches; chemically modified food starches; hydrocolloid gums (e.g., carboxymethylcellulose), and processing aids (e.g. flow aids such as silicon dioxide); as well as instant/soluble beverage components and flavorants. One of ordinary skill in the art will readily understand that the water-soluble components may be derived from multiple source ingredients (e.g., a foam stabilizer may come from a creamer and a foaming agent), and one source ingredient may contribute to multiple water-soluble components (e.g., skim milk may contribute to the sweetener (lactose) and milk solids component).

As used herein, the term "microparticulate component" and the term "microparticles" are used interchangeably and refer to particles having mean particle size diameter between 0.1 and 3.0 microns, preferably from about 0.4 to about 2.0 microns, and preferably with less than about 2% of the particles exceeding 3.0 microns. The microparticles can be obtained from protein, carbohydrate, starches, pectins and gums (hydrocolliods), or any mixture thereof, by using microparticulation processes known to those skilled in the art.

As used herein, the term "hydrocolloids" refers to the whole range of polymeric materials occurring naturally (gums, starches, proteins, etc.). The term "hydrocolloid gums" or simply "gums" refers to plant or microbial polysaccharides or their derivatives that are dispersible in either cold or hot water to produce viscous mixtures or solutions.

The term "creamer" as used herein refers to an additive used in many ready-to-drink and instant beverage products. Commercial creamers are readily available, and are readily chosen by those of ordinary skill in the art. Prepared creamers generally comprise fat, emulsifiers, and processing aids; accordingly, the beverage compositions of the present inventions utilize creamers and, depending on the composition of the particular creamer chosen, the all or part of the fat, emulsifier or processing aids used in the composition are, in fact, contributed by the creamer.

Suitable creamers for use in the flavored beverage products of the present invention include dairy and non-dairy creamers. Suitable dairy creamers include whole milk solids; butterfat solids; low-fat dry milk; and dry mixes used to prepare ice cream, milkshakes, and frozen desserts, as well as mixtures of these dairy creamers. Suitable non-dairy creamers can be made from a variety of fats and oils including soybean and partially-hydrogenated soybean oil, partially-hydrogenated canola oil, hydrogenated and partially-hydrogenated coconut oil, as well as other partially- or fully-hydrogenated vegetable oils, or combinations of such oils. Preferred creamers include non-dairy creamers made from vegetable oils, emulsifiers, co-emulsifiers, carbohydrates, sodium caseinate, and buffers. Additional creamers suitable for use in the present invention include those synthetic and imitation dairy products disclosed in KIRK-OTHMER ENCYCLOPEDIA OF CHEMICAL TECHNOLOGY, W. J. Harper, Willey Interscience, $3^{rd}$ Vol. 22, section entitled "Synthetic and Imitation Dairy Products," pp. 465–498, (1978), which is hereby incorporated by reference herein.

Both foaming and non-foaming creamers can be used in the flavored beverage products of the present invention. Foaming creamers suitable for use in the present invention can comprise a non-dairy fat (e.g., partially hydrogenated oil), a water-soluble non-dairy carbohydrate (e.g., sucrose, dextrose, maltose, corn syrup solids and mixtures thereof), a buffer, a proteinaceous foam stabilizing agent (e.g., sodium caseinate) and optionally a gum thickener. These solid components are mixed with water and then homogenized. A gas (e.g., nitrogen) is injected or blended into this mixture and the mixture spray-dried to provide the foaming creamer. See U.S. Pat. No. 4,438,147 (Hedrick, Jr.), issued Mar. 20, 1984; and U.S. Pat. No. 5,462,759 (Westerbeek et al), issued Oct. 31, 1995, both hereby incorporated by reference herein. Non-foaming creamers suitable for use in the present invention have an ingredient composition similar to that of the foaming creamers but without the incorporated gas. Also, foaming creamers typically have more proteinaceous components (typically about 12–13% of total ingredients) relative to non-foaming non-dairy creamers (typically about 3.5% of total ingredients).

The term "soluble beverage component" as used herein means those water-soluble components which are used to flavor and/or texturize the beverage products of the present invention and could consist of coffee, tea, juice and/or milk, and can be readily chosen by one of ordinary skill in the art. The soluble beverage component can be in various forms including, but not limited to powders, emulsions, concentrates, or extracts, or any mixture thereof.

As used herein, the term "comprising" means various components and processing steps can be conjointly employed in the beverage products and process for preparing these products according to the present invention. Accordingly, the term "comprising" encompasses the more restrictive terms "consisting essentially of" and "consisting of."

All amounts, parts, ratios and percentages used herein are by weight unless otherwise specified.

B. Sources of Ingredients Used in Flavored Beverage Products

1. Water-insoluble components

Fat/Oil. The terms "fat" and "oil" are used interchangeably herein unless otherwise specified. The terms "fat" or "oil" refer to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially- or fully-hydrogenated or modified otherwise, as well as non-toxic fatty materials having properties similar to triglycerides, herein referred to as non-digestible fat, which materials may be partially or fully indigestible. Reduced calorie fats and edible non-digestible fats, oils or fat substitutes are also included in the term.

The term "non-digestible fat" refers to those edible fatty materials that are partially or totally indigestible, e.g., polyol fatty acid polyesters, such as OLEAN™.

The terms "fat" or "oil" also refer 100% non-toxic fatty materials having properties similar to triglycerides. The terms "fat" or "oil" in general include fat-substitutes, which materials may be partially or fully non-digestible.

By "polyol" is meant a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentearythritol, sugar ethers such as sorbitan and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose.

By "polyol fatty acid polyester" is meant a polyol having at least 4 fatty acid ester groups. Polyol fatty acid esters that contain 3 or less fatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially non-digestible and consequently non-absorbable by the human body. It is not necessary that all of the hydroxyl groups of the polyol be esterified, but it is preferable that disaccharide molecules contain no more than 3 unesterified hydroxyl groups for the purpose of being non-digestible. Typically, substantially all, e.g., at least about 85%, of the hydroxyl groups of the polyol are esterified. In the case of sucrose polyesters, typically from about 7 to 8 of the hydroxyl groups of the polyol are esterified.

The polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, e.g., cis- or trans-isomers, and can be the same for all ester groups, or can be mixtures of different fatty acids.

Liquid non-digestible oils can also be used in the practice of the present invention. Liquid non-digestible oils have a complete melting point below about 37° C. include liquid polyol fatty acid polyesters (see Jandacek; U.S. Pat. No. 4,005,195; issued Jan. 25, 1977); liquid esters of tricarballylic acids (see Hamm; U.S. Pat. No. 4,508,746; issued Apr. 2, 1985); liquid diesters of dicarboxylic acids such as derivatives of malonic and succinic acid (see Fulcher; U.S. Pat. No. 4,582,927; issued Apr. 15, 1986); liquid triglycerides of alpha-branched chain carboxylic acids (see Whyte; U.S. Pat. No. 3,579,548; issued May 18, 1971); liquid ethers and ether esters containing the neopentyl moiety (see Minich; U.S. Pat. No. 2,962,419; issued Nov. 29, 1960); liquid fatty polyethers of polyglycerol (See Hunter et al; U.S. Pat. No. 3,932,532; issued Jan. 13, 1976); liquid alkyl glycoside fatty acid polyesters (see Meyer et al; U.S. Pat. No. 4,840, 815; issued Jun. 20, 1989); liquid polyesters of two ether linked hydroxypolycarboxylic acids (e.g., citric or isocitric acid) (see Huhn et al; U.S. Pat. No. 4,888,195; issued Dec. 19, 1988); various liquid esterfied alkoxylated polyols including liquid esters of epoxide-extended polyols such as liquid esterified propoxylated glycerins (see White et al; U.S. Pat. No. 4,861,613; issued Aug. 29, 1989; Cooper et al; U.S. Pat. No. 5,399,729; issued Mar. 21, 1995; Mazurek; U.S. Pat. No. 5,589,217; issued Dec. 31, 1996; and Mazurek; U.S. Pat. No. 5,597,605; issued Jan. 28, 1997); liquid esterified ethoxylated sugar and sugar alcohol esters (see Ennis et al; U.S. Pat. No. 5,077,073); liquid esterified ethoxylated alkyl glycosides (see Ennis et al; U.S. Pat. No. 5,059,443, issued Oct. 22, 1991); liquid esterified alkoxylated polysaccharides (see Cooper; U.S. Pat. No. 5,273,772; issued Dec. 28, 1993); liquid linked esterified alkoxylated polyols (see Ferenz; U.S. Pat. No. 5,427,815; issued Jun. 27, 1995 and Ferenz et al; U.S. Pat. No. 5,374,446; issued Dec. 20, 1994); liquid esterfied polyoxyalkylene block copolymers (see Cooper; U.S. Pat. No. 5,308,634; issued May 3, 1994); liquid esterified polyethers containing ring-opened oxolane units (see Cooper; U.S. Pat. No. 5,389,392; issued Feb. 14, 1995); liquid alkoxylated polyglycerol polyesters (see Harris; U.S. Pat. No. 5,399,371; issued Mar. 21, 1995); liquid partially esterified polysaccharides (see White; U.S. Pat. No. 4,959,466; issued Sep. 25, 1990); as well as liquid polydimethyl siloxanes (e.g., Fluid Silicones available from Dow Coming). All of the foregoing patents relating to the liquid nondigestible oil component are incorporated herein by reference. Solid non-digestible fats or other solid materials can be added to the liquid non-digestible oils to prevent passive oil loss. Particularly preferred non-digestible fat compositions include those described in U.S. Pat. No. 5,490,995 issued to Corrigan, 1996, U.S. Pat. No. 5,480,667 issued to Corrigan et al, 1996, U.S. Pat. No. 5,451,416 issued to Johnston et al, 1995, and U.S. Pat. No. 5,422,131 issued to Elsen et al, 1995. U.S. Pat. No. 5,419,925 issued to Seiden et al, 1995 describes mixtures of reduced calorie triglycerides and polyol polyesters that can be used herein. However the latter composition may provide more digestible fat.

The preferred non-digestible fats are fatty materials having properties similar to triglycerides such as sucrose polyesters. OLEAN,™ a preferred non-digestible fat, is made by The Procter and Gamble Company. These preferred non-digestible fat or oil substitute compositions are described in Young; et al., U.S. Pat. No. 5,085,884, issued Feb. 4, 1992, and U.S. Pat. No. 5,422,131, issued Jun. 6, 1995 to Elsen et al.

Other ingredients known in the art may also be added to the edible fats and oils, including antioxidants such as TBHQ ascorbic acid, chelating agents such as citric acid, and anti-foaming agents such as dimethylpolysiloxane.

The edible fats and oils with the proper particle size distribution (from about 0.1 to about 3.0 microns) are frequently delivered via a creamer.

Emulsifiers. Emulsifiers help to disperse fat in the beverage products of the present invention. Any food grade emulsifier suitable for inclusion in edible products can be used. Examples of suitable emulsifiers include mono- and di-glycerides of long chain fatty acids, preferably saturated fatty acids, and most preferably, stearic and palmitic acid mono- and di-glycerides. Propylene glycol esters are also useful in these edible mixes. Lecithin is an especially preferred emulsifier for use in the edible mixes and ready-to-serve beverages of the present invention. The emulsifier can be any food compatible emulsifier such as mono- and di-glycerides, lecithin, sucrose monoesters, polyglycerol esters, sorbitan esters, polyethoxylated glycerols and mixtures thereof. Up to about 3% and preferably from 0.1% to 3% stabilizer or emulsifier is used. Suitable emulsifiers are lactylated mono- and di-glycerides, propylene glycol monoesters, polyglycerol esters, sorbitan esters, diacetylated tartaric acid esters of mono- and di-glycerides, citric acid esters of monoglycerides, stearoyl-2-lactylates, polysorbates, succinylated monoglycerides, acetylated monoglycerides, ethoxylated monoglycerides, lecithin, sucrose monoester, and mixtures thereof. Suitable emulsifiers include Dimodan® O, Dimodan® PV, and Panodan® FDP, manufactured by Danisco Food Ingredients. The emulsifiers may be utilized with a co-emulsifier. Depending on the particular formulation chosen, suitable co-emulsifiers may be chosen from any food compatible co-emulsifier or emulsifier. Particularly preferred emulsifier/co-emulsifier systems include Dimodan® O, Dimodan® PV, and Panodan® FDP.

Microparticulate component. The microparticles which make up the microparticulate component useful in the flavored beverage products of the present invention have a substantially spheroidal shape and display fat-like mouthfeel characteristics when the particles have a mean diameter distribution in the range of from about 0.1 to about 3 microns, preferably with less than about 2% of the total number of particles over 3 microns. The particles are non-aggregated and exhibit a substantially smooth organoleptic character of an oil-in-water emulsion.

These microparticles can be prepared from a carbohydrate that can attain a substantially spheroidal or substantially round shape in the 0.1 to 3 micron diameter size range. These microparticles include, but are not limited to LITA®, a mixture of Zein protein and gum arabic, or mixtures thereof. See also, for example, U.S. Pat. No. 4,911,946 (Singer et al), issued Mar. 27, 1990; and U.S. Pat. No. 5,153,020 (Singer et al), issued Oct. 6, 1992, both of which are incorporated by reference. Suitable carbohydrates include starches, gums and/or cellulose, as well as mixtures thereof. The starches are typically modified by cross-linking to prevent excessive swelling of the starch granules using methods well-known to those skilled in the art. Other suitable carbohydrates include calcium alginate, cross-linked, dextran, gellan gum, curdlan, konjac mannan, chitin, schizophyllan and chitosan. Carbohydrates that do not have a natural round shape must be treated so that they attain a substantially spheroidal shape. This can be accomplished by making a solution of the carbohydrate and converting the solution to a gel quickly and uniformly (generally in a field of high shear-force) so that a narrow distribution of a gelled microparticles are formed having the above described diameters. Generally, a stream of carbohydrate solution will be introduced into a highly turbulent reaction zone where the gelled microparticles are formed. High speed mixing and shearing conditions can also be employed. Calcium alginate microparticles can be formed by making a solution of sodium alginate and introducing this solution into a calcium ion containing solution through e.g. an ultrasonic spray nozzle or any device producing droplets less than 3 microns in diameter. Gellan can be microparticulated by spray cooling a hot gellan solution via any device capable of producing droplets less than 3 microns resulting in the formation of spheriodally-shaped microparticles. Konjac mannan can be microparticulated by introducing a solution into a turbulent, heated, alkaline reaction zone. Once the carbohydrate microparticles are formed, they must be substantially non-aggregated and remain that way. Aggregate blocking agents, for example, lecithin and xanthan gum, can be added to the microparticles to stabilize the particles. See U.S. Pat. No. 4,734,287 (Singer et al), issued Mar. 29, 1988, which is incorporated by reference.

These microparticles can also be prepared from any protein that can attain a substantially spheroidal or substantially round shape in the 0.1 to 3 micron diameter size range. These microparticles include, but are not limited to, Simplessee 100® and DAIRY-LO®, both of which are whey proteins, or mixtures thereof. See U.S. Pat. No. 4,734,287 (Singer et al), issued Mar. 29, 1988; and U.S. Pat. No. 4,961,953 (Singer et al), issued Jun. 16, 1989, both of which are incorporated by reference. Suitable protein sources for preparing such microparticles include egg and milk proteins, plant proteins (especially including oilseed proteins obtained from cotton, palm, rape, safflower, cocoa, sunflower, sesame, soy, peanut, and the like), and microbial proteins such as yeast proteins and the so-called "single cell" proteins. Preferred proteins include dairy whey protein (especially sweet dairy whey protein), and non-dairy-whey proteins such as bovine serum albumin, egg white albumin, and vegetable whey proteins (i.e., non-dairy whey protein) such as soy protein. microparticles are readily prepared from solutions of these proteins through controlled application of heat and high shear conditions facilitative of controlled protein denaturation in a physical and chemical context allowing for the formation of non-aggregated proteinaceous microparticles of the desired size and shape. The particles formed during denaturation are generally spherical in shape and have average diameters in excess of about 0.1 microns. The formation of particles in excess of about 2 microns in diameter and/or formation of aggregates of small particles with aggregate diameters in excess of 2 microns is substantially avoided. Alternatively, the formation of particles or aggregates of particles having volumes in excess of 5.5 cubic microns is avoided while forming substantial numbers of particles having volumes of $5-10^{-4}$ cubic microns or more. The protein denaturing temperatures employed and the duration of heat treatment will vary depending upon the particular protein starting material. In a like manner, the specific high shear conditions including the duration of shear applied to protein solutions will also vary. During the denaturation processing, undenatured proteins in solution interact to form insoluble coagulates, and the controlled application of heat and high shear forces operate to insure formation of non-aggregated particles within the desired size range. Depending upon the specific properties of dissolved commercial protein materials and the properties of non-protein constituents in the solutions of these materials, the application of heat and high shear alone may not optimally allow for the avoidance of oversized particle aggregates. In such situation, one or more materials such as lecithin, xanthan gum, maltodextrins, carageenan, datem esters, alginates, and the like, (referred to as "aggregate blocking agents") can preferably be added to the protein solutions, most preferably prior to heat denaturation processing.

Microcrystalline cellulose. These carbohydrate- or protein-derived microparticles can be partially substituted with a microcrystalline cellulose. Microcrystalline cellulose (sometimes referred to as "cellulose gel") is a nonfibrous form of cellulose that is prepared by partially depolymerizing cellulose obtained as a pulp from fibrous plant material with dilute mineral acid solutions. Following hydrolysis, the hydrocellulose is purified via filtration and the aqueous slurry is spray-dried to form dry, white, odorless, tasteless, porous particles having a broad size distribution. See U.S. Pat. No. 3,023,104, issued Feb. 27, 1962, U.S. Pat. No. 2,978,446 and U.S. Pat. No. 3,141,875 (all of which are incorporated by reference) which disclose methods of preparing microcystalline cellulose. Suitable commercially available microcrystalline celluloses include EMCOCEL®. from Edward Mendell Co., Inc. and Avicel®. from FMC Corp. In addition, microcrystalline cellulose can be produced through a microbial fermentation process. Commercially available microcrystalline cellulose produced by a fermentation process includes PrimaCEL™ from The Nutrasweet Kelco Company.

2. Water-soluble component

Soluble beverage component. The soluble beverage components are readily available to, and can be easily chosen by, one having ordinary skill in the art. Soluble beverage components can include coffee, tea, milk, and/or juice, any mixtures thereof. The soluble beverage components may be in liquid, solid concentrates, powder, extract, or emulsion form.

The preferred soluble beverage component for use in the flavored beverage products of the present invention is determined by the particular application of the product. For example, if the application is a coffee beverage, the soluble beverage component is, generally, coffee. For a tea or juice beverage product, the soluble beverage component is generally, tea or juice, respectively.

For example, the soluble coffee used in the coffee products of the present invention can be prepared by any convenient process. A variety of such processes are known to those skilled in the art. Typically, soluble coffee is prepared by roasting and grinding a blend of coffee beans, extracting the roast and ground coffee with water to form an aqueous coffee extract, and drying the extract to form instant coffee. Soluble coffee useful in the present invention is typically obtained by conventional spray drying processes. Representative spray drying processes that can provide suitable soluble coffee are disclosed in, for example, pages 382–513 of Sivetz & Foote, *COFFEE PROCESSING TECHNOLOGY*, Vol. I (Avi Publishing Co. 1963); U.S. Pat. No. 2,771,343 (Chase et al), issued Nov. 20, 1956; U.S. Pat. No. 2,750,998 (Moore), issued Jun. 19, 1956; and U.S. Pat. No. 2,469,553 (Hall), issued May 10, 1949, all of which are incorporated herein by reference. Other suitable processes for providing instant coffee for use in the present invention are disclosed in, for example, U.S. Pat. No. 3,436,227 (Bergeron et al), issued Apr. 1, 1969; U.S. Pat. No. 3,493,388 (Hair), issued Feb. 3, 1970; U.S. Pat. No. 3,615,669 (Hair et al), issued Oct. 26, 1971; U.S. Pat. No. 3,620,756, (Strobel et al), issued Nov. 16, 1971; U.S. Pat. No. 3,652,293 (Lombana et al), issued Mar. 28, 1972, all of which are incorporated herein by reference. In addition to spray dried instant coffee powders, instant coffee useful in the present invention can include freeze-dried coffee. The instant coffee can be prepared from any single variety of coffees or a blend of different varieties. The instant coffee can be decaffeinated or undecaffeinated and can be processed to reflect a unique flavor characteristic such as expresso, French roast, or the like.

Buffers. The flavored beverage products of the present invention utilize buffers, preferably stabilizing salts to improve the colloidal solubility of proteins and maintain the pH on the finished beverage of 6.2 to 7.0 for optimum stability and flavor. The disodium or dipotassium salts of citric acid or phosphoric acid are most commonly used. The use of phosphate salts is particularly desirable when the water used for the preparation of the beverage is high in calcium or magnesium.

Thickeners. Flavored beverage products according to the present invention can comprise thickening agents. These thickening agents include natural and synthetic gums, and natural and chemically modified starches. Suitable gums include locust bean gum, guar gum, gellan gum, xanthan gum, gum ghatti, modified gum ghatti, tragacanth gum, carrageenan, and/or anionic polymers derived from cellulose such as carboxymethylcellulose, sodium carboxymethylcellulose, as well as mixtures of these gums. Suitable starches include, but are not limited to, pregelatinized starch (corn, wheat, tapioca), pregelatinized high amylose content starch, pregelatinized hydrolyzed starches (maltodextrins, corn syrup solids), chemically modified starches such as pregelatinized substituted starches (e.g., octenyl succinate modified starches such as N-Creamer, N-Lite LP, TEXTRA, manufactured by National Starch), as well as mixtures of these starches. It is particularly preferred that thickening agents be predominantly made from starches and that no more than 20%, most preferably no more than 10%, of the thickener be made from gums. These thickening agents can also be incorporated into these flavored beverage products as part of the carrier for the emulsified fat on the spray dried non-foaming creamer.

Foam stabilizer. The flavored beverage products of the present invention can also include a proteinaceous foam stabilizer. Suitable proteinaceous foam stabilizers include egg white albumin (ovalbumin), whey protein, soy protein, soy protein isolate, corn protein isolate, as well as mixtures of these stabilizers. Dried egg white albumin is particularly preferred because of its ability to form better and more stable foams at relatively low concentrations. The other proteinaceous foam stabilizers (e.g., whey protein) are typically effective only at much higher concentrations than egg white albumin.

These proteinaceous foam stabilizers decrease the surface tension so as to form continuous films due to complex intermolecular interactions to prevent rupture of the foam bubbles. Basically, the foam stabilizer acts as a macromolecular surfactant that provides multiple "anchor" or contact points at the air-water interface of the foam bubbles that are generated when the products of the present invention are mixed with water to form the beverage. Proteins with rapid adsorption and unfolding at the air-water interface produce better foams than proteins that adsorb slowly and resist unfolding at the interface. Unfolding and the ability to form thicker and more cohesive films depends on the elasticity of the protein which is further related to the flexibility of the protein in the adsorbed layer, i.e., proteins that exhibit high elasticity have very low flexibility. The greater stability of foams where egg white is used is due to the high concentration of rigid globular proteins present that have higher flexibility (i.e., caused by disulfide bonds in protein). Egg white typically has at least 40 different globular glycoproteins with ovalbumin accounting for usually about 54% of these glycoproteins.

Acid. Flavored beverage products, especially flavored instant coffee products, according to the present invention also preferably comprise an edible water-soluble acid (organic or inorganic). Suitable acids include citric acid, malic acid, tartaric acid, fumaric acid, succinic acid, phosphoric acid, as well as mixtures of these acids.

Carbonate/Bicarbonate. Flavored beverage products according to the present invention may comprise an edible water-soluble carbonate or bicarbonate (or mixture thereof) salt that evolves carbon dioxide when it reacts with the acid. Suitable carbonate or bicarbonate salts include sodium bicarbonate, sodium carbonate, potassium bicarbonate, potassium bicarbonate, as well as any mixture thereof. Sodium carbonate and bicarbonate are especially preferred when used in combination with citric acid. The reaction between the sodium carbonate/bicarbonate with the citric acid forms sodium citrate that stabilizes sodium caseinate (e.g., from the foaming and non-foaming creamer) in solution when the instant beverage (e.g., coffee) product is reconstituted in harder water.

Sweeteners. Flavored beverage products according to the present invention can further comprise sweeteners. Preferred sweeteners for use in the present invention are sugars and sugar alcohols such as sucrose, fructose, dextrose, maltose, lactose, high fructose corn syrup solids, invert sugar, sugar alcohols, including sorbitol, as well as mixtures of these sugars and sugar alcohols. In order to deliver lower levels of solids per dosage, it is particularly preferred to use a higher intensity sweetener with the sugar or sugar alcohol. These higher intensity sweeteners include saccharin, cyclamates, acesulfame K (Sunette™), L-aspartyl-L-phenylalanine lower alkyl ester sweeteners (e.g., aspartame); L-aspartyl-D-alanine amides disclosed in U.S. Pat. No. 4,411,925 to Brennan et al.; L-aspartyl-D-serine amides disclosed in U.S. Pat. No. 4,399,163 to Brennan et al.; L-aspartyl-L-1-hydroxymethylalkaneamide sweeteners disclosed in U.S. Pat. No. 4,338,346 to Brand; L-aspartyl-1-hydroxyethylalkaneamide sweeteners disclosed in U.S. Pat. No. 4,423,029 to Rizzi; and L-aspartyl-D-phenylglycine ester and amide sweeteners disclosed in European Patent Application 168,112 to J. M. Janusz, published Jan. 15, 1986.; and the like and mixtures thereof. A particularly preferred sweetener system is a combination of sucrose with aspartame and acesulfame K. This mixture not only enhances sweetness, but also lowers the level of solids that is delivered in preparing the beverage.

Milk Solids. Milk solids can also be included in the flavored beverage products, according to the present invention. These milk solids can be prepared by drying milk to produce a mixture of the proteins, minerals, whey and other components of milk in a dry form. These solids can include butterfat solids and cream powder but are preferably low-fat dry milk and non-fat milk solids, i.e., the solids derived from milk that has had the fat removed. Any commercial source of non-fat or other milk solids can be used. Dry mixes used to prepare ice cream, milk-shakes, and frozen desserts can also be included in these flavored beverage products. These dry mixes provide an especially creamy, rich mouthfeel to the coffee beverage prepared when the flavored instant coffee products of the present invention are mixed with water.

Processing Aids. Optional ingredients in the beverage products of the present invention are processing aids, including flow aids, anti-caking agents, dispersing aids, and the like. Particularly preferred are flow aids such as silicon dioxide and silica aluminates. Starches, aside from the thickening agents, can also be included to keep the various ingredients from caking.

3. Flavorants

Flavored beverage products of the present invention typically include a flavorant(s) other than those inherently present in the soluble beverage component. The flavored component may be found in either the water-soluble component or the water-insoluble component, or both. Preferably, such flavors are obtained from encapsulated or liquid flavors. These flavors can be natural or artificial in origin. Preferred flavors, or mixtures of flavor, include almond nut, amaretto, anisette, brandy, cappuccino, mint, cinnamon, cinnamon almond, creme de menthe, Grand Mariner®, peppermint stick, pistachio, sambuca, apple, chamomile, cinnamon spice, creme, creme de menthe, vanilla, French vanilla, Irish creme, Kahlua®, mint, peppermint, lemon, macadamia nut, orange, orange leaf, peach, strawberry, grape, raspberry, cherry, coffee, chocolate, cocoa, mocha and the like, and any mixtures thereof; as well as flavorant/aroma enhancers such as acetaldehyde, herbs, spices, as well as any mixtures thereof.

4. Water

Up to 95%, (generally from about 80 to about 95%) water may be added to the flavored beverage products components of the present invention. Particularly with ready-to-drink formulations, water is added to the composition up to 80%, preferably up to 95%. Water is generally not added to the instant formulations by the manufacturer. Water or other liquid is generally not added to instant beverages except as part of the soluble beverage component.

5. S/I Ratio, I/S Ratio, and I/V Ratio

The beverage products of the present invention, (especially preferred are instant coffee products), can deliver a creamy, rich, preferably foamy, beverage with a clean, improved mouthfeel and thickness without "sliminess" or "stringiness", as well as a higher flavor impact, at a lower dosage of solids (5–10%, preferably 6.5–8.5%, and more preferably 7.5%). This is achieved by formulating said beverage products so that (1) the level of finely dispersed water-insoluble components in the product is such that the ratio of (a) water-soluble to water-insoluble components (S/I) is about 3.3 or less, or (b) the ratio of water-insoluble to water-soluble (I/S) components is 0.30 or greater, preferably at least 0.40 or greater and most preferably between about 0.40 and about 0.80; and/or (2) the level of water-insoluble components per unit volume (I/V), is at least about 0.019 grams per cubic centimeter.

C. Flavored Instant Beverage Products and Method for Making

The instant flavored beverage products of the present invention comprise: a water-insoluble component, a water-soluble component, and, optionally, a flavorant. Said water-insoluble component has particles with a mean particle size diameter of from about 0.1 to about 3.0 microns, preferably from about 0.4 to about 2.0, microns and includes: (1) from about 3 to about 40%, preferably from about 5 to about 30%, most preferably from about 8% to about 25%, of a microparticulate component; (2) from about 0 to about 5%, preferably from about 1.0 to about 3.0%, of a microcrystalline cellulose; (3) from about 0.0% to about 40%, preferably from about 3 to about 40%, of a fat/oil component; and (4) from about 0.0% to about 3%, preferably from about 0.1 to about 3%, emulsifier. Said water-soluble component includes: (1) from about 1 to about 40%, preferably from about 5 to about 20%, soluble beverage component; (2) from about 0.05 to about 25%, preferably from about 1.0 to about 15%, of a thickener; (3) optionally from about 1 to about 20%, preferably from about 4 to about 15%, of a foaming creamer; (4) optionally from about 0.1 to about 20%, preferably from about 0.5 to about 10%, of a proteinaceous foam stabilizer; (5) optionally from about 0.1 to about 5%, preferably from about 0.5 to about 3%, of the edible acid; (6) optionally from about 0.1 to about 5%, preferably from about 0.5 to about 3%, of the carbonate/bicarbonate salt; (7) optionally an effective amount of a sweetener; (8) optionally up to about 20% milk solids. At least one of the water-soluble and water-insoluble components preferably includes an effective amount of a flavorant. The ratio of water-soluble to water-insoluble components is about 3.3 or less, preferably from about 1.5 to about 2.5 (i.e., the ratio of water-insoluble to water-soluble (I/S) components is 0.30 or greater, preferably from about 0.400 to about 0.667), or the insoluble component per unit volume of the product is at least about 0.019 g/cc, preferably at least 0.022 g/cc.

The preferred method for preparing the flavored instant beverage products of the present invention is to dry blend the water-insoluble and water-soluble components together in a paddle, drum, screw, plough type mixer, or the like to provide the final instant coffee product.

One preferred method for preparing the flavored instant coffee products of the present invention is to dry blend the water-insoluble and water-soluble components together and then agglomerate the mixture, preferably by steam agglomeration. It has been found that steam agglomeration of this mixture increases rate of solubility of resulting flavored instant beverage product, as compared to a flavored instant beverage product where only a portion of this mixture is agglomerated. See U.S. Pat. No. 5,433,962 (Stipp), issued Jul. 18, 1995 (herein incorporated by reference for suitable methods for performing steam agglomeration).

Another preferred method for making the flavored instant beverage products of the present invention involves a special blend of emulsifiers as wetting agents; said special blend includes lecithin, propylene glycol, ethoxylated mono and diglycerides, and a sucrose fatty acid ester, combined with maltodextrin and water to make a binder solution. The wetting agents are at about 0.20 to about 0.33%, preferably about 0.27%, dry basis of the finished product. The ethoxylated mono and diglycerides, the lecithin, and the propylene glycol together comprise from about 0.1% to about 0.3%, preferably about 0.2%, dry basis of finished product. The lower sucrose fatty acid esters is from about 0.01% to about 0.04%, preferably about 0.02% dry basis. The binder solution is sprayed onto a previously mixed flavored instant beverage product base in a high intensity example, a Schugi type agglomerator. The particle size is increased and the binder solution with the wetting agents is added as the particles are formed so the wetting agents are thoroughly mixed inside of the newly formed granule.

After the desired particle size is reached, the granule is dried in a fluid bed dryer to remove the excess water used during the agglomeration step. To preserve flavor during the drying, the inlet air temperature is preferably kept below 160° F.

The particle size of the granule is manipulated using standard screening operations to essentially between 20 and 600 microns. It is generally more preferred that a minimum of about 60% of the granules have a size greater than about 212 microns, and a maximum of about 2% have a particle size greater than about 600 microns.

The sized granule is finally combined in an admix with flavor, foaming ingredients, and processing aids to complete the product. It has been found this process provides a more dense product with better consumer dissolvability than previously known when compared to steam agglomeration.

D. Flavored Drinkable Beverages and Their Preparation

The ready-to-drink flavored beverage products of the present invention comprise: a water-insoluble component, a water-soluble component, flavorants, and, optionally, water. Said water-insoluble component has particles with a mean particle size diameter of from about 0.1 to about 3.0, preferably from about 0.4 to about 2.0, microns and includes: (1) from about 0.20 to about 8.0%, preferably from about 0.30 to about 5.0%, preferably from about 0.35 to about 2.50%, of a microparticulate component; (2) from about 0 to about 0.70%, preferably from about 0.075 to about 0.35%, of a microcrystalline cellulose; (3) from about 0.0% to about 5.0%, preferably from about 0.2% to about 5.0%, of a fat component; (4) from about 0.0% to about 0.2%, preferably from about 0.004 to about 0.2% of an emulsifier blend. Said water-soluble component includes: (I) from about 0.075 to about 5.0%, preferably from about 0.35 to about 2.5%, soluble beverage component; (2) up to about 3.0%, preferably from about 0.05 to about 2.0%, of a thickener; (3) optionally an effective amount of a sweetener; (4) optionally up to about 3.0% milk solids. The ready-to-drink flavored beverage comprises from up to about 95%, water, preferably from about 80 to about 95% water.

The ratio of water-soluble to water-insoluble components is about 3.3 or less, preferably from about 1.5 to about 2.5

(i.e., the ratio of water-insoluble to water-soluble (I/S) components is 0.30 or greater, preferably from about 0.400 to about 0.667), or the insoluble component per unit volume of the product is at least about 0.019 g/cc, preferably at least 0.022 g/cc.

The preferred method for preparing the ready-to-drink flavored beverage products of the present invention is as follows: The fat and emulsifiers are dry blended together and heated until all the fat has been melted. Hot water is added to the oil/emulsifier blend and mixed with a high shear mixer to form the proper emulsion. The water-soluble components including the beverage soluble solids, the thickener, and optionally the sweetener and milk solids are added while the high shear mixing continues. The microparticulate component is added to the mixture with continued agitation, and the emulsion/dispersion is homogenized in a two stage APV Gaulin homogenizer at pressures ranging from 500/2500 psi to 1000/4600 psi.

ANALYTICAL METHODS

Method for Measuring Particle Size of Protein/Stabilizer Particles

The particle size distribution of the water-insoluble components of the beverages of the present invention is measured using a laser scattering system, Horiba LA900 (Horiba, Calif.). Two types of distributions are used to properly define particle size. First, the Volume Distribution is used to follow structural changes and the effect of large particles in small number; this Volume Distribution usually results in a bimodal (some times trimodal) curve. Second, Number Distribution is used to measure the number of particles of a given median particle size. Typically, the Number Distribution results in a single peak which is properly characterized by its median. For median particle size below 0.5, there is no significant difference between median and mean particle size. However, we prefer to use median particle size to account for proper description for cases which depart from normal distribution. 1 to 2 ml samples are prepared according to the procedures recommended by the equipment manufacturer.

EXAMPLES

The following examples illustrate flavored instant coffee products made according to the present invention.

EXAMPLE 1

A foamable flavored coffee beverage is prepared by mixing a non-foaming liquid creamer containing the aqueous insoluble matter, (e.g., the finely dispersed fat and the microparticulate components) with a dry mix containing the soluble ingredients (e.g., instant coffee, foaming ingredients, sweeteners and flavorants).

A. Non-Foaming Liquid Creamer: A non-foaming creamer (about 2900 ml) is prepared from the following ingredients:

| Ingredient | Grams |
| --- | --- |
| High Oleic Sunflower Oil | 52.9 |
| Simplesse ® 100 (microparticulated whey protein) | 19.44 |
| Starch | 14.04 |

-continued

| Ingredient | Grams |
| --- | --- |
| Corn Syrup Solids | 8.64 |
| Dipotassium Phosphate | 4.32 |
| Microcrystalline Cellulose | 2.16 |
| Carboxymethylcellulose | 4.32 |
| Emulsifier | 2.16 |
| Water | 2790 |

The oil and emulsifiers are blended in a 4000 ml beaker and heated to 150° F. (65.5° C.) until all the fat has been melted. One thousand ml of water at 180° F. (82° C.) is added to the oil/emulsifier blend and mixed with a high shear mixer for 1 minute to form the proper emulsion. The starch, corn syrup solids, microcrystalline cellulose, carboxymethlycellulose, dipotassium phosphate and 1290 ml of water at 180° F. (82° C.) are added while the high shear mixing continues. In a separate 1500 ml beaker, the Simplesse® 100 is mixed with 500 ml. of hot water at 180° F. (82° C.) using a magnetic stirrer and until all particles are dispersed (no visible clumps). This Simplesse® 100 dispersion is mixed with the oil/emulsifier/solids emulsion and mixed manually with a spatula. This blend is homogenized in a two stage APV Gaulin homogenizer at 1000/4600 psi.

B. Dry mix: A dry mix (500 g.) is prepared from the following ingredients:

| Ingredient | Grams |
| --- | --- |
| Sucrose | 237.5 |
| Aspartame | 1.5 |
| Acesulfame K | 1.5 |
| Instant Coffee | 122.5 |
| Foaming creamer | 81.5 |
| Dried Egg White | 18.0 |
| Citric Acid | 7.0 |
| Sodium Bicarbonate | 9.0 |
| Flavors | 21.5 |

All of the ingredients except the foaming creamer are placed in a Hobart mixer and mixed for 5 minutes. After this initial 5 minute period, the foaming creamer is added to the mixer and mixed for a second 2 minute period.

C. Flavored coffee beverage: A beverage (1000 ml) is prepared by mixing 41 grams of the dry mix with 930 ml of the non-foaming liquid creamer and 30 ml of water at 180° F. (82° C.). This beverage contains a total of 7.5% solids (soluble and insoluble solids), a water-soluble matter to water-insoluble matter (S/I)=2.35, and a water-insoluble matter per unit volume (I/V)=0.0226 g/cc.

The S/I, I/S, and I/V for the flavored coffee beverage of this example are calculated as follows:

Total solids (soluble+insoluble) in 1000 ml of the flavored coffee beverage=75.65 grams.

Insoluble Matter($I$)=$I$(Oil)+$I$(Simplesse®100)+$I$(Microcrystalline cellulose)+$I$(fat from foaming creamer)

$I_{(Oil)}$=(52.9/2897.98)*930=16.97 grams $I_{(Simplesse®100)}$=(19.44*0.5/2897.98)*930=3.12 grams Approximately 50% of the dry Simplesse® 100 is soluble, therefore only 50% of this components is considered as microparticules contributing to the insoluble matter.

$I_{(Microcrystalline\ cellulose)}=(2.16*/2897.98)*930=0.69$ grams $I_{(fat\ from\ foaming\ creamer)}=(81.5/500)*41*0.27=1.80$ grams $I=16.97+3.12+0.69+1.80=22.58$ grams Soluble Matter$(S)=75.65-I$ $I=75.65-22.58=53.07$ grams $S/I=53.07$ grams$/22.58$ grams$=2.35$ $I/S=22.58$ g$/53.07$ g$=0.424$ $I/V=22.58$ g$/1000$ cc$=0.0226$ g/cc

EXAMPLE 2

A flavored foamable instant coffee product (1000 g.) is prepared from the following ingredients:

| Ingredient | Grams |
| --- | --- |
| Non-dairy creamer (50% fat) | 379.5 |
| Simplesse ® 100 (microparticulated whey protein) | 73.5 |
| Starch | 53.2 |
| Sucrose | 178 |
| Aspartame | 1.4 |
| Acesulfame K | 1.4 |
| Instant Coffee | 121 |
| Foaming creamer | 99.0 |
| Dried Egg White | 18.8 |
| Citric Acid | 9.4 |
| Sodium Bicarbonate | 11.4 |
| Microcrystalline Cellulose | 8.3 |
| Carboxymethylcellulose | 16.3 |
| Silicon dioxide | 10 |
| Flavors | 18.8 |

All of the ingredients except the foaming creamer are placed in a Hobart mixer and mixed for 5 minutes. After this initial 5 minute period, the foaming creamer is added to the mixer and mixed for a second 2 minute period.

Flavored coffee beverage: A beverage (1000 ml) is prepared by mixing 82 grams of the dry mix and adding 918 ml of water at 180° F. (82° C.). This beverage contains a total of 8.2% solids (soluble and insoluble solids), a water-soluble matter to water-insoluble matter (S/I)=2.82, and a water-insoluble matter per unit volume (I/V)=0.0214 g/cc.

The S/I, I/S, and IV for the flavored coffee beverage of this example are calculated as follows:

Total solids(soluble+insoluble) in 1000 ml of the flavored coffee beverage=82.0 grams.

Insoluble Matter $(I)=I$(fat from non-dairy creamer)$+I$(Simplesse®100)$+I$(Microcrystalline cellulose)$+I$(fat from foaming creamer)

$I_{(fat\ from\ non-dairy\ creamer)}=(379.5*0.5)=189.75$ grams

Non-dairy creamer contains 50% fat.

$I_{(Simplesse®\ 100)}=(73.5*0.5)=36.75$ grams

Approximately 50% of the dry Simplesse® 100 is soluble, therefore only 50% of this components is considered as microparticules contributing to the insoluble matter.

I(Microcrystalline cellulose)=8.3 grams $I_{(fat\ from\ foaming\ creamer)}=(99.0*0.27)=26.73$ grams $I=189.75+36.75+8.3+26.73=261.53$ grams Soluble Matter$(S)=1000-I$ $I=1000-261.53=738.47$ grams $S/I=738.47$ gramns$/261.53$ grams$=2.82$ $I/S=261.53$ g$/738.47$ g$=0.354$ $I/V=(261.53$ gr$/1000$ gr$)*(82$ grams$/1000$ cc$)=0.0214$ g/cc

EXAMPLE 3

A flavored foamable instant coffee product (1000 g) is prepared by blending together the following ingredients:

| Ingredient | Grams |
| --- | --- |
| Non-dairy creamer (50% fat) | 377.8 |
| Simplesse ® 100 | 73.5 |
| Starch | 53.2 |
| Sucrose | 178 |
| Aspartame | 1.4 |
| Acesulfame K | 1.4 |
| Instant Coffee | 121 |
| Foaming creamer | 99.0 |
| Dried Egg White | 18.8 |
| Citric Acid | 9.4 |
| Sodium Bicarbonate | 11.4 |
| Dipotassium Phosphate | 20.0 |
| Carboxymethylcellulose | 16.3 |
| Flavors | 18.8 |

All of the ingredients except the foaming creamer are placed in a Hobart mixer and mixed for 5 minutes. After this initial 5 minute period, the foaming creamer is added to the mixer and mixed for a second 2 minute period.

Flavored coffee beverage: A beverage (1000 ml) is prepared by mixing 82 grams of the dry mix and adding 918 ml of water at 180° F. (82° C.). This beverage contains a total of 8.2% solids (soluble and insoluble solids), a water-soluble matter to water-insoluble matter (S/I) ratio of 2.96, and a water-insoluble matter to a water-soluble matter (I/S) of 0.338, and a water-insoluble matter per unit volume (I/V)= 0.0207 g/cc.

EXAMPLE 4

A flavored foamable instant coffee product (1000 g.) is prepared from the following ingredients:

| Ingredient | Grams |
| --- | --- |
| Non-dairy creamer (50% fat) | 379.5 |
| Simplesse ® 100 (microparticulated whey protein) | 100 |
| Starch | 51.3 |
| Sucrose | 178 |
| Aspartame | 1.4 |
| Acesulfame K | 1.4 |
| Instant Coffee | 121 |
| Foaming creamer | 99.0 |
| Dried Egg White | 18.8 |
| Citric Acid | 9.4 |
| Sodium Bicarbonate | 11.4 |
| Silicon dioxide | 10 |
| Flavors | 18.8 |

All of the ingredients except the foaming creamer are placed in a Hobart mixer and mixed for 5 minutes. After this initial 5 minute period, the foaming creamer is added to the mixer and mixed for a second 2 minute period.

Flavored coffee beverage: A beverage (1000 ml) is prepared by mixing 82 grams of the dry mix and adding 918 ml of water at 180° F. (82° C.). This beverage contains a total of 8.2% solids (soluble and insoluble solids), a water-soluble matter to water-insoluble matter (S/I) ratio of 2.75, a water-insoluble matter to water-soluble matter (I/S) ratio of 0.364, and a water-insoluble matter per unit volume (I/V)=0.0218 g/cc.

EXAMPLE 5

A flavored foamable instant coffee product (1000 g.) is prepared from the following ingredients:

| Ingredient | Grams |
| --- | --- |
| Non-dairy creamer (50% fat) | 380.8 |
| Simplesse ® 100 (microparticulated whey protein) | 150 |
| Sucrose | 178 |
| Aspartame | 1.4 |
| Acesulfame K | 1.4 |
| Instant Coffee | 121 |
| Foaming creamer | 99.0 |
| Dried Egg White | 18.8 |
| Citric Acid | 9.4 |
| Sodium Bicarbonate | 11.4 |
| Silicon dioxide | 10 |
| Flavors | 18.8 |

All of the ingredients except the foaming creamer are placed in a Hobart mixer and mixed for 5 minutes. After this initial 5 minute period, the foaming creamer is added to the mixer and mixed for a second 2 minute period.

Flavored coffee beverage: A beverage (1000 ml) is prepared by mixing 82 grams of the dry mix and adding 918 ml of water at 180° F. (82° C.). This beverage contains a total of 8.2% solids (soluble and insoluble solids), a water-soluble matter to water-insoluble matter (S/I) ratio of 2.42, a water-insoluble matter to water-soluble matter (I/S) ratio of 0.413, and a water-insoluble matter per unit volume (I/V)=0.0239 g/cc.

EXAMPLE 6

A ready-to-drink flavored coffee beverage (about 2900 ml) is prepared from the following ingredients:

| Ingredient | Grams |
| --- | --- |
| Partially Hydrogenated Canola Oil | 53.0 |
| Simplesse ® 100 (microparticulated whey protein) | 19.5 |
| Starch | 14.0 |
| Sucrose | 58.0 |
| Aspartame | 0.35 |
| Acesulfame K | 0.35 |
| Coffee soluble solids | 30 |
| Dipotassium Phosphate (buffer) | 4.32 |
| Microcrystalline Cellulose | 2.16 |
| Carboxymethylcellulose | 4.32 |
| Emulsifier | 2.16 |
| Flavors | 5.0 |
| Water | 2790 |

The oil and emulsifiers are blended in a 4000 ml beaker and heated to 150° F. (65.5° C.) until all the fat has been melted. One thousand ml of water at 180° F. (82° C.) is added to the oil/emulsifier blend and mixed with a high shear mixer for 1 minute to form the proper emulsion. The starch, sucrose, aspartame, acesulfame K, coffee soluble solids, corn syrup solids, microcrystalline cellulose, carboxymethylcellulose, dipotassium phosphate, flavors and 1290 ml of water at 70° F. (21.1° C.) are added while the high shear mixing continues. In a separate 1500 ml beaker, the Simplesse® 100 is mixed with 500 ml. of hot water at 180° F. (82° C.) using a magnetic stirrer and until all particles are dispersed (no visible clumps). This Simplesse® 100 dispersion is mixed with the oil/emulsifier/solids emulsion and mixed manually with a spatula. This blend is homogenized in a two stage APV Gaulin homogenizer at 1000/4600 psi. This beverage contains a total of 6.5% solids (soluble and insoluble solids), a water-soluble matter to water-insoluble matter (S/I) ratio of 2.0, a water-insoluble matter to water-soluble matter (I/S) ratio of 0.500, and a water-insoluble matter per unit volume (I/V)=0.0216 g/cc.

EXAMPLE 7

A flavored instant tea product (1000 g.) is prepared from the following ingredients:

| Ingredient | Grams |
| --- | --- |
| Non-dairy creamer (50% fat) | 400 |
| Simplesse ® 100 (microparticulated whey protein) | 150 |
| Sucrose | 278 |
| Starch | 50 |
| Aspartame | 1.0 |
| Acesulfame K | 1.0 |
| Instant Tea | 100 |
| Silicon dioxide | 10 |
| Flavors | 10 |

All of the ingredients are placed in a Hobart mixer and mixed for 5 minutes.

Flavored creamy tea beverage: A beverage (1000 ml) is prepared by mixing 82 grams of the dry mix and adding 918 ml of water at 180° F. (82° C.). This beverage contains a total of 8.2% solids (soluble and insoluble solids), a water-soluble matter to water-insoluble matter (S/I) ratio of 2.63, a water-insoluble matter to water-soluble matter (I/S) ratio of 0.380, and a water-insoluble matter per unit volume (I/V)=0.0225 g/cc.

EXAMPLE 8

A. Non-Foaming Liquid Creamer: A non-foaming creamer (about 2900 ml) is prepared from the following ingredients:

| Ingredient | Grams |
| --- | --- |
| Part. Hydrog. Canola Oil | 500 |
| Micro-particulated whey protein | 180 |
| Starch | 130 |
| Corn Syrup Solids | 120 |
| Dipotassium Phosphate (buffer) | 20 |
| Sodium Caseinate | 50 |
| Emulsifier | 20 |
| Water | 2333 |

The oil and emulsifiers are blended in a 4000 ml beaker and heated to 160° F. (71 ° C.) until all the fat has been melted. The oil/emulsifier blend is added to two thousand three hundred and thirty-three ml of water at 190° F. (88° C.) and mixed with a high shear mixer for 2 minute to form a pre-emulsion. The starch, corn syrup solids, sodium caseinate, and dipotassium phosphate are added under high shear mixing. The whey protein is added to the pre-emulsion, but with normal agitation until all particles are dispersed (no visible clumps). This blend is homogenized in a two stage APV Gaulin homogenizer at 1000/4600 psi. The liquid beverage creamer (30% solids) is spray-dried in a typical commercial spray-dryer, for example, a Niro Atomizer with an inlet temperature of about 220–230° C. and outlet temperature about 110–120° C.

B. Ready-to-drink beverage: A ready-to-drink orange beverage is prepared from the following formulation:

| Ingredient | % |
|---|---|
| Water | 72.25 |
| Beverage creamer | 10.30 |
| Sweetener | 12.00 |
| Orange juice | 5.00 |
| Citric Acid | 0.28 |
| Orange Flavors | 0.17 |

For a finished product batch, a beverage creamer preblend solution is prepared in a container fitted with high shear mixer as follows: The tank is loaded with hot water (71° C., 160° F.). Under agitation, the beverage creamer is added at such a rate as to obtain a smooth mixture with no visible lumps. This may take several minutes. With continued high speed agitation the dry citric acid powder is added at a rate of 15 pounds/minute to a concentration of 80 mM. The median particle size of the creamer beverage particles range from 0.30 microns to 0.80 microns.

The beverage creamer preblend solution is then added to a blend tank with the remaining ingredients. The blend tank is agitated with a sweep agitator at 28 rpm. This blend is pasteurized at (86° C.±1.5° C., 187° F.±3° F.) for 13±3 seconds and conventionally bottled.

EXAMPLE 9

A. Chocolate dry mix: A chocolate powder mix is prepared from the following ingredients:

| Ingredient | % |
|---|---|
| Granular Sucrose | 67.16 |
| Beverage creamer | 15.00 |
| Sodium Chloride | 0.40 |
| Fermented Cocoa Powder, 14% fat | 16.00 |
| Colors | 0.07 |
| Citric Acid | 0.50 |
| Butylated Hydroxytoluene (BHT) | 0.0004 |
| Vitamin Mix (vitamin C, riboflavin, niacin, thiamin and pantothenic acid) | 0.46 |
| Ferrous Fumarate | 0.06 |
| Mineral Mix (tribasic calcium phosphate) | 0.05 |
| Artificial Chocolate Flavor | 0.30 |

The chocolate powder is prepared by mixing the above ingredients together until the powder is homogeneous. A drinkable beverage is prepared by adding 25 g. of this powder to 240 ml of milk and then stirring vigorously.

This beverage contains a total of 19.4% total solids (soluble and insoluble) and a water-soluble matter to water-insoluble matter (S/I)=4.8, a water-insoluble matter to water-soluble matter (I/S) ratio of 0.287, and a water insoluble matter per unit volume (I/V)=0.403 g/cc.

B. Ready-to-drink fortified beverage: Preparation of ready-to-serve nutritionally fortified beverage can be carried out in a similar manner to the preparation of beverage mixes (see A above), at least as it relates to the dry ingredients such as the cocoa powder, beverage creamer, iron source, vitamins and other minerals, etc. The primary difference is the addition of an aqueous fluid, typically in an amount of from about 80 to about 95%, of the finished ready-to serve beverage product. Suitable aqueous fluids include water and milk. Suitable milk sources include whole milk, low fat milk, skim milk, milk fluids made by reconstituting milk powders with water and the like.

EXAMPLE 10

A ready to drink flavored coffee beverage (about 1000 ml) is prepared from the following ingredients:

| Ingredient | Grams |
|---|---|
| Water | 450.8 |
| Skim Milk | 397 |
| Coffee extract (7.5% solids) | 43 |
| Sucrose | 62 |
| Simplesse 100 | 30 |
| Aspartame | 0.1 |
| Acesulfame K | 0.1 |
| Flavors | 17 |

The water and Simplesse 100 are blended in a beaker for 2 minutes using a BRAUN hand mixer (high shear). Sucrose, aspartame, acesulfame K and flavors are added and the mixture is mixed for 1 minute using the high shear mixer. The coffee extract and skim milk are added and the mixture is mixed by hand using a spatula.

EXAMPLE NO. 11

Non-Fat Coffee Beverage. Using the method described in Example 6, a ready-to-drink flavored coffee beverage (1000 gr) is prepared from the following ingredients:

| Ingredient | grams |
|---|---|
| Water | 626.8 |
| Skim Milk | 280 |
| Simplesse 100 | 20 |
| Coffee Extract (5% solids) | 50 |
| Fructose | 8 |
| Aspartame | 0.1 |
| Acesulfame K | 0.1 |
| Defatted Cocoa powder | 10 |
| N&A Flavors | 5 |
|  | 1000 g |

EXAMPLE NO. 12

Non-Fat Coffee Beverage. Using the method described in Example 6, a ready-to-drink flavored coffee beverage (1000 gr) is prepared from the following ingredients:

| Ingredient | grams |
| --- | --- |
| Water | 441.8 |
| Skim Milk | 450 |
| Simplesse 100 | 20 |
| Coffee Extract (5% solids) | 60 |
| Fructose | 8 |
| Aspartame | 0.1 |
| Acesulfame K | 0.1 |
| Vanilla Flavor | 20 |
| | 1000 g |

EXAMPLE NO. 13

Creamy Tea Beverage. Using the method described in Example 7, a ready-to-drink creamy tea beverage (1000 gr) is prepared from the following ingredients:

| Ingredient | grams |
| --- | --- |
| Brewed Tea | 930 |
| Fructose | 50 |
| Simplesse 100 | 20 |
| | 1000 g |

EXAMPLE NO. 14

Creamy Orange Beverage. Using the method described in Example 7, a ready-to-drink creamy orange beverage (1000 gr) is prepared from the following ingredients.

| Ingredient | grams |
| --- | --- |
| Orange Juice | 500 |
| Water | 430 |
| Fructose | 50 |
| Simplesse 100 | 20 |
| | 1000 g |

EXAMPLE NO. 15

Creamy Mango Beverage. Using the method described in Example 7, a ready-to-drink creamy orange beverage (1000 gr) is prepared from the following ingredients.

| Ingredient | grams |
| --- | --- |
| Mango mania (Mistic ® Beverage) | 970 |
| Simplesse 100 | 30 |
| | 1000 g |

EXAMPLE NO. 16

Creamy Strawberry-Kiwi Beverage. Using the method described in Example 7, a ready-to-drink creamy orange beverage (1000 gr) is prepared from the following ingredients.

| Ingredient | grams |
| --- | --- |
| Strawberry-Kiwi (Mistic ® Beverage) | 970 |
| Simplesse 100 | 30 |
| | 1000 g |

EXAMPLE 17

A ready-to-drink flavored coffee beverage (about 1000 ml) is prepared from the following ingredients:

| Ingredient | Grams |
| --- | --- |
| Water | 451 |
| Milk (2% fat) | 397 |
| Coffee extract (7.5% solids) | 43 |
| Sucrose | 62 |
| Simplesse 100 | 30 |
| Flavors | 17 |

The water and Simplesse 100 are blended in a beaker for 2 minutes using a BRAUN hand mixer (high shear). Sucrose, and flavors are added and the mixture is mixed for 1 minute using the high shear mixer. The coffee extract and milk are added and the mixture is mixed by hand using a spatula.

What is claimed is:

1. A flavored beverage product which comprises:
   a. a water-insoluble component having particles with a mean particle size diameter of from about 0.1 to about 3.0 microns which comprises:
      (1) from about 0.2 to about 40% of a microparticulate component;
      (2) from about 0.0 to about 40% of a fat/oil component;
      (3) from about 0.0 to about 3.0% of an emulsifier;
      (4) from about 0 to about 5% of a microcrystalline cellulose; and
   b. a water-soluble component which comprises:
      (1) from about 0.075 to about 40% of a soluble beverage component;
      (2) from about 0.05 to about 30% of a thickener;
      (3) from about 0 to about 4% buffers;
      (4) from about 0 to about 60% foam stabilizer;
      (5) from about 0 to about 5% acid;
      (6) from about 0 to about 5% carbonate/bicarbonate;
      (7) from about 0 to about 10% sweetener;
      (8) from about 0 to about 20% milk solids;
      (9) from about 0 to about 3% processing aids; and
   c. from about 0 to about 10% of a flavorant; and
   d. from about 0 to about 95% water; and
   wherein the ratio of the water-soluble to water-insoluble components in said beverage product is about 3.3 or less.

2. A flavored beverage product according to claim 1 wherein the emulsifiers are selected from a group consisting of monoglyceride emulsifiers, diglyceride emulsifiers, monoglyceride and diglyceride blended emulsifiers, ionic emulsifiers, co-emulsifiers, and mixtures thereof.

3. A flavored beverage product according to claim 1 wherein the microparticulate component is selected from a group consisting of whey protein, plant protein, and mixtures thereof.

4. A flavored beverage product according to claim 1 wherein the microparticles are prepared from a carbohydrate selected from the group consisting of starches, gums, cellulose, calcium alginate, cross-linked dextran, gellan gum, curdlan, konjac mannan, chitin, schizophyllan and chitosan, or any mixture thereof.

5. A flavored beverage product according to claim 1 wherein the microparticles are prepared from a protein selected from the group consisting of egg proteins, dairy whey proteins, non-dairy whey proteins, plant proteins, microbial proteins, and mixtures thereof.

6. A flavored beverage product according to claim 1 wherein the buffer is a disodium or dipotassium salt of citrate or phosphoric acid, or any mixture thereof.

7. A flavored beverage product according to claim 1 wherein the thickener is chosen from the group consisting of locust bean gum, gruar gum, gellan gum, xanthan gum, gum ghatti, modified gum ghatti; tragacanth gum; carrageenan, carboxymethylcellulose, sodium carboxymethylcellulose, corn starch, wheat starch, tapioca starch, pregelatinized high amylose-content starch, pregelatinized hydrolyzed starches, maltodextrins, corn syrup solids, chemically-modified starches, and mixtures thereof.

8. A flavored beverage product according to claim 1 wherein the sweetener is a combination of sucrose, aspartame, and acesulfame K.

9. A flavored beverage product according to claim 1 that comprises of flow aids including silicon dioxide, silica aluminates, or mixtures thereof.

10. A flavored beverage product according to claim 1 wherein all or a portion of the fat/oil component is selected from the group consisting of a non-digestible fat, a non-digestible oil, and mixtures thereof.

11. A flavored beverage product which comprises:
   a. a water-insoluble component having particles with a mean particle size diameter of from about 0.1 to about 3.0 microns which comprises:
      (1) from about 0.2 to about 40% of a microparticulate component;
      (2) from about 0.0 to about 40% of a fat/oil component;
      (3) from about 0.0 to about 3.0% of an emulsifier;
      (4) from about 0 to about 5% of a microcrystalline cellulose; and
   b. a water-soluble component which comprises:
      (1) from about 0.075 to about 40% of a soluble beverage component;
      (2) from about 0.05 to about 30% of a thickener;
      (3) from about 0 to about 4% buffers;
      (4) from about 0 to about 60% foam stabilizer;
      (5) from about 0 to about 5% acid;
      (6) from about 0 to about 5% carbonate/bicarbonate;
      (7) from about 0 to about 10% sweetener;
      (8) from about 0 to about 20% milk solids;
      (9) from about 0 to about 3% processing aids; and
   c. from about 0 to about 10% of a flavorant; and
   d. from about 0 to about 95% water; and
wherein the water-insoluble component in said beverage product per unit volume of the product is at least about 0.019 g/cc.

12. A flavored beverage product which comprises:
   a. a water-insoluble component having particles with a mean particle size diameter of from about 0.1 to about 3.0 microns which comprises:
      (1) from about 0.2 to about 40% of a microparticulate component;
      (2) from about 0.2 to about 40% of a fat/oil component;
      (3) from about 0.1 to about 3.0% of an emulsifier;
      (4) from about 0 to about 5% of a microcrystalline cellulose; and
   b. a water-soluble component which comprises:
      (1) from about 0.075 to about 40% of a soluble beverage component;
      (2) from about 0.05 to about 30% of a thickener;
      (3) from about 0 to about 4% buffers;
      (4) from about 0 to about 60% foam stabilizer;
      (5) from about 0 to about 5% acid;
      (6) from about 0 to about 5% carbonate/bicarbonate;
      (7) from about 0 to about 10% sweetener;
      (8) from about 0 to about 20% milk solids;
      (9) from about 0 to about 3% processing aids; and
   c. from about 0 to about 10% of a flavorant; and
   d. from about 0 to about 95% water; and
wherein the water-insoluble component in said beverage product per unit volume of the product is at least about 0.019 g/cc.

13. A ready-to-drink flavored beverage which comprises:
   a. a water-insoluble component having particles with a particle size of 0.4 to about 2.0 microns which comprises:
      (1) from about 0.2 to about 5.0% of a microparticulate component;
      (2) from about 0 to about 0.70% of microcrystalline cellulose;
      (3) from about 0.2 to about 5.0% of a fat component;
      (4) from about 0.004 to about 0.2% of an emulsifier; and
   b. a water-soluble component which comprises:
      (1) from about 0.075 to about 5.0% of a soluble beverage component;
      (2) from about 0 to about 3.0% of a thickener;
      (3) optionally an effective amount of a sweetener;
      (4) optionally up to about 3.0% milk solids; and
   c. from about 80 to about 95% water; and
wherein at least one of the water-insoluble and water-soluble components includes an effective amount of a flavorant; and wherein the ratio of water-insoluble to water-soluble components is at least 0.300 or greater.

14. A flavored beverage product according to claim 12 wherein the proteins are selected from the group consisting of dairy whey protein, non-dairy protein, and mixtures thereof.

15. A ready-to-drink flavored beverage which comprises:
   a. a water-insoluble component having particles with a particle size of 0.4 to about 2.0 microns which comprises:
      (1) from about 0.2 to about 5.0% of a microparticulate component;
      (2) from about 0 to about 0.70% of microcrystalline cellulose;
      (3) from about 0.0 to about 5.0% of a fat component;
      (4) from about 0.0 to about 0.2% of an emulsifier; and
   b. a water-soluble component which comprises:
      (1) from about 0.075 to about 5.0% of a soluble beverage component;
      (2) from about 0 to about 3.0% of a thickener;
      (3) optionally an effective amount of a sweetener;
      (4) optionally un to about 2.0% milk solids; and
   c. from about 80 to about 95% water; and
wherein at least one of the water-soluble and water-insoluble components includes an effective amount of a flavorant; and wherein the insoluble component per unit volume of the product is at least about 0.019 g/cc.

16. An instant flavored beverage product which comprises:
   a. a water-insoluble component having particles with a particle size of 0.4 to about 2.0 microns which comprises:

(1) from about 3 to about 40% of a microparticulate component;
(2) from about 0 to about 5% of microcrystalline cellulose;
(3) from about 0 to about 40%, of a fat/oil component; and
(4) from about 0 to about 3% emulsifier; and b. a water-soluble component which comprises:
(1) from about 1 to about 40% of a soluble beverage component;
(2) from about 0.05 to about 25% of a thickener;
(3) optionally from about 1 to about 20% of a foaming creamer;
(4) optionally from about 0.1 to about 20% of a proteinaceous foam stabilizer;
(5) optionally from about 0.1 to about 5% of the edible acid;
(6) optionally from about 0.1 to about 5% of the carbonate/bicarbonate salt;
(7) optionally an effective amount of a sweetener; and
(8) optionally up to about 20% milk solids; and wherein at least one of the water-soluble and water-insoluble components includes an effective amount of a flavorant; and the ratio of water-soluble to water-insoluble components is about 3.3 or less, and the ratio of water-insoluble components to water-soluble components is about 0.300 or greater.

17. An instant flavored beverage product which comprises:

a. a water-insoluble component having particles with a particle size of 0.4 to about 2.0 microns which comprises:
(1) from about 3 to about 40% of a microparticulate component;
(2) from about 0 to about 5% of microcrystalline cellulose;
(3) from about 0 to about 40%, of a fat/oil component; and
(4) from about 0 to about 3% emulsifier; and b. a water-soluble component which comprises:
(1) from about 1 to about 40% of a soluble beverage component;
(2) from about 0.05 to about 25% of a thickener;
(3) optionally from about 1 to about 20% of a foaming creamer;
(4) optionally from about 0.1 to about 20% of a proteinaceous foam stabilizer;
(5) optionally from about 0.1 to about 5% of the edible acid;
(6) optionally from about 0.1 to about 5% of the carbonate/bicarbonate salt;
(7) optionally an effective amount of a sweetener; and
(8) optionally up to about 20% milk solids; and wherein at least one of the water-soluble and water-insoluble components includes an effective amount of a flavorant; and the ratio of water-soluble to water-insoluble component per unit volume of the product is at least about 0.019 g/cc.

* * * * *